Nov. 9, 1971        H. J. EPPINGER        3,618,498
CHROMATIC RANGEFINDER
Filed July 23, 1970
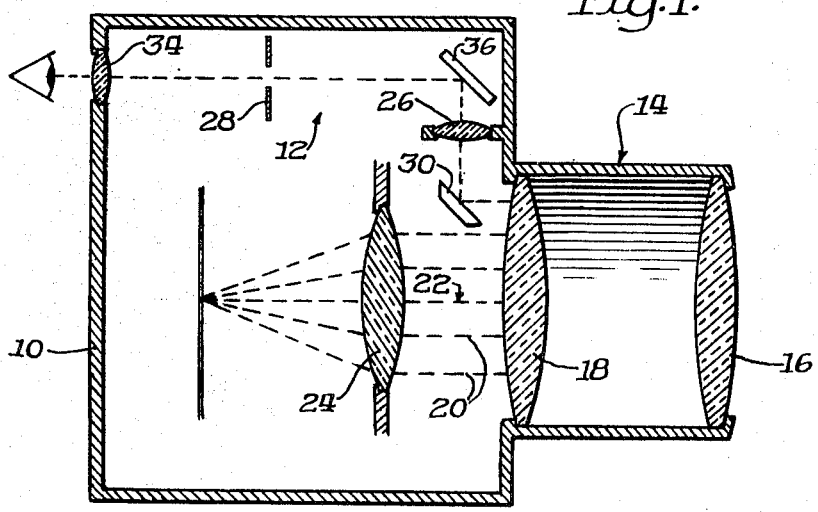
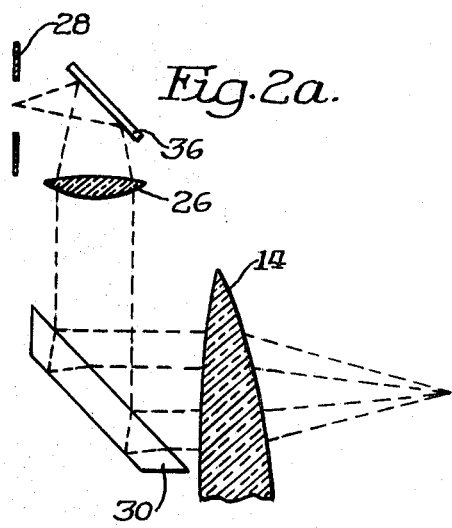
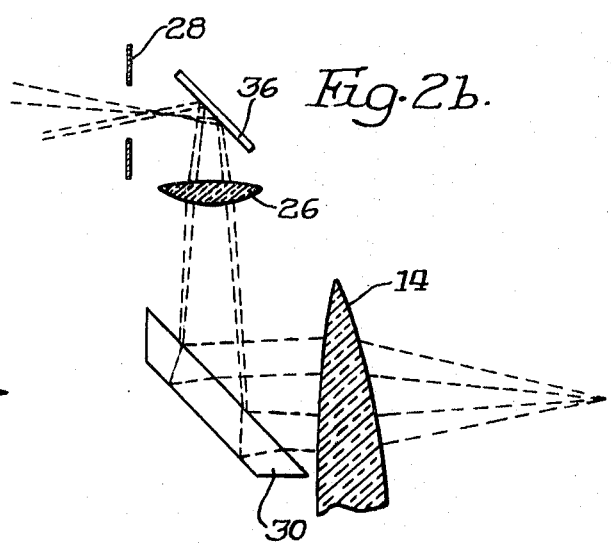
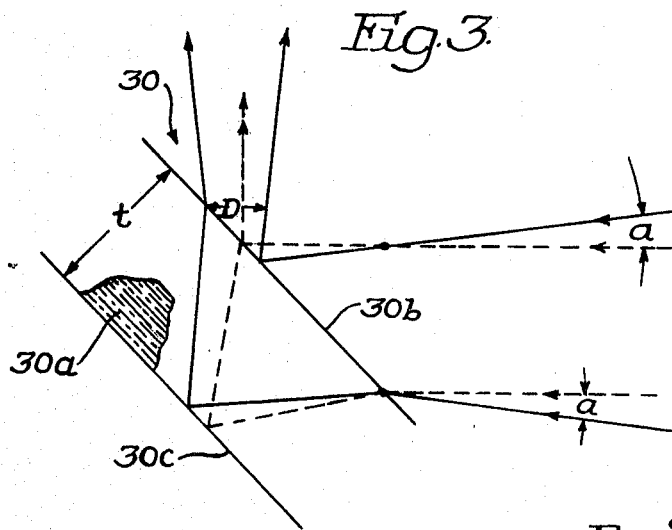
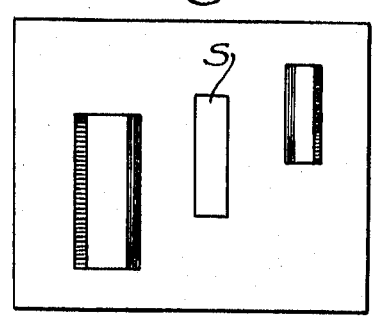
Inventor:
Hans J. Eppinger.
By William F. Pugh
John E. Beele Jr. Attys

United States Patent Office 3,618,498
Patented Nov. 9, 1971

---

3,618,498
CHROMATIC RANGEFINDER
Hans J. Eppinger, Des Plaines, Ill., assignor to Bell &
Howell Company, Chicago, Ill.
Filed July 23, 1970, Ser. No. 57,600
Int. Cl. G03b 3/00
U.S. Cl. 95—44 C
3 Claims

ABSTRACT OF THE DISCLOSURE

Disclosed is an improvement in an optical rangefinder system for a camera having a reflex type viewfinder and a focusable variable focal length lens, the system providing a superimposed image viewing system by interposing in the optical path of the lens a single parallel planar surfaced mirror coated on the rear surface to be totally reflecting and on the front surface with a dichroic material to reflect to the viewfinder a first chromatic component of an image and to transmit to the reflecting surface remaining chromatic components of the image, which latter surface reflects the image into the viewfinder in coincidence with the first chromatic component as a neutral color of a subject in the image when the objective is in focus on the subject and out of coincidence so as to generate color fringing of the subject in the image when the objective is out of focus on that subject.

---

This invention relates to an improved range finder system for a single lens reflex type photographic or cinematographic camera. Particularly, the invention relates to a combined range and viewfinder system of the superimposed image type, which is simple and accurate, which has no moving parts, wherein the viewed image of a subject is caused to be chromatically fringed when a focusable objective is not focused on the subject, and wherein the chromatically distinct images are made coincident and therefore neutral when the objective is focused on the subject.

Rangefinder systems of the superimposed image type which provide chromatically distinguishable images are known. Most such systems have at least a movable mirror coupled to the focusable objective lens to obtain alignment of the movable image relative to a stationary direct image when the objective is focused on the subject. The primary viewing image usually is chromatically neutral. The secondary or ranging image is made distinguishable by displaying only a relatively small central area of the viewed image, and by tinting of the movable mirror. Because this mirror is always in the field of view, the overall and continuous chromatic tone of the small image is distracting to the user.

Other types of superimposed image rangefinders are also known, such as described in U.S. Patent No. 3,230,-851. Small chromatically neutral mirrors are interposed in the optical path of the camera to reflect bundles of light rays to the viewfinder. When focus of the objective is proper, the light ray bundles merge to form a single image of the subject in the viewfinder of the camera. However, when focus is not proper, the bundles form duplicate overlapping images in the viewfinder. Hence, to obtain the desired result with this system, the user must carefully appraise the image to determine if the lens is focused on the subject. Further, one of the reflecting surfaces is 50% transmitting and 50% reflecting as to the quantity of light impinging thereon. Considering this arrangement, a substantial quantity of light is lost before reaching the viewfinder eyepiece, thus reducing the brilliance of the viewed image.

To overcome the primary disadvantages of reduced brilliance of the viewed image in the prior art and to enable more precise differentiation of the images so as to enable accurate focusing of the image, a novel rangefinder system is described. The invention relates broadly to the insertion of an image pick-off mirror in the optical path of a camera. The mirror is a transparent substrate having a dichroic coating on a forward surface and a substantially 100% reflective coating on a rearward surface. Because of the selective light transmission and reflection character of the dichroic coating, the forward surface reflects an image of one chromatic content and transmits to the reflecting surface the remaining chromatic content of the image. The latter image is reflected through the first coating to form in the view finder a second image of second chromatic content. When the objective is out-of-focus on a remote subject, the bundles of light rays traveling along different paths generate discrete color fringed images. However, when the objective is in focus, the bundles of light rays are superimposed and by the principles of additive color combine in the viewfinder to form the natural color of the subject. That is, the first and second chromatic separations re-combine into the color from which they were divided. Since the dichroic filter reflects and transmits neary 100% of the light and the light rays transmitted are nearly 100% reflected, only a small percentage of light is lost. Hence, the resulting viewfinding and rangefinding system is brilliant compared with prior art systems, and provides color fringing when the objective is out-of-focus and neutral color when the image is in focus.

It is an object of the invention to provide a chromatic rangefinder having the foregoing characteristics which rangefinder has no moving parts and no parts requiring independent alignment, which will be efficient in use and can be manufactured and assembled in an optical device at a low cost.

Other objects will be apparent from the description of the accompanying drawings in which like numerals refer to like parts.

In the drawings:

FIG. 1 is a schematic representation of an optical instrument incorporating the rangefinder of this invention;

FIGS. 2a and 2b are similar representations of the light path of the instrument with parts scaled disproportionately to show schematic ray tracings for in-focus and out-of-focus conditions respectively;

FIG. 3 is an enlarged schematic representation of the mirror substrate and of ray tracings for in-focus and out-of-focus conditions;

FIG. 4 is a schematic representation of a viewfinder image of a subject (a rectangle) as seen in focus and out-of-focus when the subject is to either side of the plane of focus of the objective.

Referring to the figures, an optical instrument, such as a camera 10 is shown having a viewfinder system 12 and a focusable variable focal length objective lens assembly 14. The lens assembly 14 as represented herein comprises a focusing element 16 and an independently movable variable focal length element or zoom cell 18. From the latter element or zoom cell 18, collimated light rays or beams 20 are passed along a portion of optical path 22 to the prime lens 24 of the objective system or a similar objective component 26 of the viewfinder system which objective focuses the light beams on an image plane 28 coincident with the viewfinder mask. Between the zoom cell 18 and objective components 24 and 26, an image pick-off mirror 30 is positioned angularly to the optical axis so as to receive some of the collimated light rays and reflect these rays toward a secondary or beam redirecting mirror 36 and the viewfinder exit pupil 34.

Image pick-off or rangefinding mirror 30 functions in cooperation with the zoom component to provide dual and single images of a scene and to enable the viewfinder to perform both as viewfinder and also as a rangefinder. As shown in FIG. 3, the single mirror 30 is formed of a substrate of transparent material, such as glass 30a having parallel planar surfaces. A dichroic coating 30b is applied to the forward surface, and a totally reflecting mirror coating 30c is applied to the rear surface. The dichroic coating 30b is selected from the class of material which divides light into chromatic components with one component being transmitted and the other component being reflected. A typical dichroic coating, described as a preferred embodiment, reflects the red component of an image and transmits the remaining cyan component. The light rays forming the cyan chromatic component enter the substrate 30a and impinge on the totally reflecting rear coating 30c for reflection thereof in coincidence with the light rays of the red component when the rays are parallel or slightly out of coincidence when the rays are not parallel.

By the positioning of pick-off mirror 30 in a portion of the optical path to receive collimated light rays, the separate chromatic components of light rays impinging on the mirror 30 are reflected toward the viewfinder in substantially parallel paths. That is, the light rays from dichroic surface 30b form a first complete image of the subject, absent only the transmitted or non-reflected chromatic component of the image. The secondary light rays reflected from the rear surface 30c of the mirror form a second complete image of the subject based on the transmitted chromatic component. If lens assembly 14 is focused on a subject, in a remote subject plane, rays emerging from zoom cell 18 are parallel and coincide in the viewfinder. However, if lens assembly 14 is not focused on the subject, rays impinging on mirror 30 are not parallel. Hence, the light rays reflected and transmitted from the mirror are non-coincident and therefore form separate and distinct dual images of the scene. Because the light rays are not coincident, the respective images formed are slightly offset laterally one from the other in that the angles of incidence and emergence of the light rays relative to mirror 30 are different.

Using the preferred dichroic coating, one image has a substantial red content while the other image has a substantial cyan (blue-green) content. Hence, as seen in FIG. 4, using a rectangle as a subject, the subject matter of one offset image is fringed along one edge with one chromatic component such as red, while the other edge of the subject is fringed with cyan. The overlapping portions of the subject of similar tone content have adequate quantities of both chromatic components to reconstruct the original color. Thus, by the principles of additive color, the overlapped image of the subject is neutral insofar as being represented in substantially the identical colors, tones, and shades of the original scene. Similarly, all color fringing becomes invisible about a subject focused upon.

Because the light rays from the surfaces of mirror 30 effectively cross over at the plane of focus, the color fringing one side of a subject when the objective is focused beyond the plane of that subject is shifted to the other side of the subject when the lens is focused before the plane of the subject. The light rays reflected from the forward or dichroic surface cause fringing along one edge and from the rear surface cause fringing on the opposite edge for similar out-of-focus conditions. Therefore, for a pair of chromatic components, a user can determine by location of the chromatic fringes whether the lens is out-of-focus before or beyond the subject.

The maximum degree of fringing or the fringing efficiency of the chromatic rangefinder, as optically generated, is effectively dependent upon image displacement. The index of refraction and the thickness of the substrate determines the separation of the beams and thus image displacement. The greater the degree of fringing, the more precise the user can visually detect correct focus. However, the maximum extent of displacement and beam separation, before image vignetting occurs, is determined by the dimensional ratio between the diameter of the viewfinder entrance pupil and the diameter of the zoom cell exit pupil.

As seen in FIGS. 2a, 2b, and 3, the mirror operates as a chromatic rangefinder in response to the angle of incidence of light rays impinging on the mirror, and the angles of emergence and reflectance of these light rays. When the collimated rays are parallel as seen in FIGS. 2a and 3 (dashed lines), they appear to arrive from infinity as when focused on a subject. Thus, rays reflected from the dichroic surface and rays refracted by and reflected from the mirrored surface emerge in coincidence. Since all coincident light rays are focused at the same plane of focus in the viewfinder, a single image of a subject focused on is seen.

When an objective is focused before or beyond a subject, the incident light rays are angled relative to one another. Hence, as seen in FIGS. 2b and 3 (solid lines), the rays reflected by the dichroic or front surface form a first image in the viewfinder. Since the angle of incidence of the rays transmitted through the dichroic filter is different, these rays are refracted and reflected to emerge from the substrate displaced from the path of reflectance of the rays from the front surface. Thus, the second rays form in the viewfinder a second image displaced by distance D from the first image. The degree of fringing or image displacement distance D is related mathematically to the thickness $t$ of the planar parallel substrate, the refractive index of that substrate, the angle of incidence of he incident light rays, and the focal length of the zoom objective. As the angle $\alpha$ changes such that the displacement becomes greater, the fringing visible in the viewfinder increases.

What is claimed is:

1. A rangefinder system for a camera for focusing of a scene image by examining an image through a reflex type viewfinder optically coupled to a focusable objective lens, the system comprising:
    a transparent substrate optically coupling the objective and the viewfinder and having planar parallel first and second surfaces,
    said first surface having a dichroic coating for selective chromatic transmission and reflection of the scene image content,
    said second surface having a totally reflecting coating to reflect the transmitted chromatic content of the scene images; and
    said reflecting surfaces together reflecting substantially all incident scene image light into coincidence when the objective is in-focus and reflecting said light out of coincidence so as to cause chromatic fringing when said objective is out-of-focus.

2. A rangefinding system as in claim 1, wherein said dichroic coating reflects to the viewfinder at least one chromatic component of the scene image, and transmits into the substrate at least a second chromatic component of the scene image.

3. A rangefinding system as in claim 1, wherein one chromatic content of an image generates image fringing on one side of a subject of the image when said lens is focused on a plane before the subject plane and on the other side of the subject of the image when said lens is focused on a plane beyond the subject plane.

References Cited

UNITED STATES PATENTS 2,352,777   7/1944   Douden            356—10
3,367,254   2/1968   Townsley         95—44 C SAMUEL S. MATTHEWS, Primary Examiner E. M. BERO, Assistant Examiner U.S. Cl. X.R.

356—10; 88—1.5